United States Patent
Treyz et al.

(10) Patent No.: US 6,529,316 B1
(45) Date of Patent: Mar. 4, 2003

(54) OPTICAL NETWORK EQUIPMENT WITH OPTICAL CHANNEL MONITOR AND DYNAMIC SPECTRAL FILTER ALARMS

(75) Inventors: G. Victor Treyz, San Carlos, CA (US); Jun Ye, Palo Alto, CA (US)

(73) Assignee: Onetta, Inc., Sunnyvale, CA (US)

( * ) Notice: Subject to any disclaimer, the term of this patent is extended or adjusted under 35 U.S.C. 154(b) by 0 days.

(21) Appl. No.: 09/878,220

(22) Filed: Jun. 12, 2001

Related U.S. Application Data

(60) Provisional application No. 60/288,074, filed on May 3, 2001.

(51) Int. Cl.[7] .................. H04B 10/08; H04B 10/02; H04B 10/12; G02B 5/22
(52) U.S. Cl. .................. 359/337.11; 359/110; 359/177; 359/341.4; 359/337.2; 359/350
(58) Field of Search .................. 359/161, 177, 359/337, 337.11, 337.1, 337.2, 337.21, 337.22, 341.4, 124, 110

(56) References Cited

U.S. PATENT DOCUMENTS

| | | | |
|---|---|---|---|
| 5,253,104 A | 10/1993 | Delavaux | 359/341 |
| 5,815,299 A * | 9/1998 | Bayart et al. | 359/124 |
| 5,861,981 A | 1/1999 | Jabr | 359/341 |
| 5,864,581 A | 1/1999 | Alger-Meunier et al. | 375/224 |
| 5,933,552 A | 8/1999 | Fukushima et al. | 385/24 |
| 5,969,834 A | 10/1999 | Farber et al. | 359/110 |
| 5,986,782 A * | 11/1999 | Alexander et al. | 359/110 |
| 6,016,213 A | 1/2000 | Farber et al. | 359/177 |
| 6,061,171 A | 5/2000 | Taylor et al. | 359/341 |
| 6,064,501 A * | 5/2000 | Roberts et al. | 359/110 |
| 6,115,174 A | 9/2000 | Grubb et al. | 359/334 |
| 6,151,157 A | 11/2000 | Ball et al. | 359/341 |
| 6,160,659 A | 12/2000 | Kinoshita | 359/337 |
| 6,198,570 B1 | 3/2001 | Fukushima et al. | 359/337 |
| 6,215,581 B1 | 4/2001 | Yadlowsky | 359/337 |
| 6,222,668 B1 | 4/2001 | Dutrisac et al. | 359/337 |
| 6,246,510 B1 * | 6/2001 | BuAbbud et al. | 359/337 |
| 6,313,941 B1 * | 11/2001 | Suzuki et al. | 359/161 |
| 6,344,914 B1 * | 2/2002 | Shimojoh et al. | 359/161 |
| 6,400,497 B1 * | 6/2002 | Suzuki et al. | 359/160 |
| 6,411,417 B1 * | 6/2002 | Roberts et al. | 359/124 |
| 2002/0041432 A1 * | 4/2002 | Onaka et al. | 359/337.1 |

FOREIGN PATENT DOCUMENTS

| | | |
|---|---|---|
| EP | 762 667 A2 | 3/1997 |
| JP | 11-275027 A2 | 8/1999 |
| WO | WO 97/28584 | 8/1997 |
| WO | WO 99/66607 | 12/1999 |
| WO | WO 99/67609 | 12/1999 |
| WO | WO 00/4613 A1 | 1/2000 |
| WO | WO 00/14909 | 3/2000 |
| WO | WO 00/49721 | 8/2000 |

OTHER PUBLICATIONS

Konishi et al. Dynamic gain–controlled erbium–doped filter amplifier repeater for WDM network, OFC'97, Feb. 1997, pp. 18 19.*

(List continued on next page.)

*Primary Examiner*—Thomas G. Black
*Assistant Examiner*—Andrew R. Sommer
(74) *Attorney, Agent, or Firm*—Fish & Neave; G. Victor Treyz

(57) ABSTRACT

Optical amplifiers and other optical network equipment is provided for use in fiber-optic communications networks. The equipment may include dynamic spectral filters and optical channel monitors. Temperature controllers may be used to control the temperatures of the dynamic spectral filters, optical channel monitors, and other components such as erbium-doped fiber coils in optical gain stages. Control units in the equipment may provide alarms based on status information and data from the dynamic spectral filters, optical channel monitors, temperature sensors, and other components.

19 Claims, 12 Drawing Sheets

OTHER PUBLICATIONS

Brimrose "Dynamic Gain Flattening Filter" specification sheet. www.brimrose.com/gain_flattening.html. posted Feb. 8, 2001.*

Agere Systems "Optical Amplifier Platform, 1724–Type Erbium–Doped Fiber Amplifier (S and V Series) Data Sheet" Jul. 1999 (entire).*

Fitel Technologies "Fully Digitized MPU Controlled EDFA" (ErFA 3300 Series) Data Sheet, Feb. 2000.*

Mas et al. "An Efficient Algorithm for Locating Soft and Hard Failures in WDM Networks" IEEE J. Selected Areas in Communications. 18:10, Oct. 2000, pp. 1900–1911.*

Laing et al. "An erbium–doped fiber ampliier with dynamically gained–flattened spectrum." OFC'98 Tech. Digest 1998, pp. 138 139.*

Yun et al. "Dynamic Erbium–Doped Fiber Amplifier Based on Active Gain Flattening with Fiber Acoustooptic Tunable Filters." IEEE Photonics Tech. Lett. 11:10, Oct. 1999, pp. 1229–1231.*

Schiffer et al. "Smart Dynamic Wavelength Equalizer Based on an Integrated Planar Optical Circuit for Use in the 1550 nm Region." IEEE. Photonics Tech. Lett. 11:9, Sep. 1999, pp. 1150–1152.*

Lee et al. "Experimental Characterization of a Dynamically Gain Flattened Erbium–Doped Fiber Amplifier." IEEE Photonics Tech. Lett. 8:12, Dec. 1996, pp. 1612–1614.*

Zhu et al. "1.28 Tbit/s (32 × 40 Gbit/s) Transmission over 1000 km NDSF Employing Distributed Raman Amplification and Active Gain Flattening" Electronics Letters, vol. 37, No. 1, p. 43–45 (Jan. 4, 2001).

Ono et al. "Automatic Gain Control in Silica–Based EDFA with over 50nm Flat Gain Bandwidth using an all Optical Feedback Loop" $10^{th}$ Optical Amplifiers and their Applications Technical Digest, Jun. 9–11, 1999.

Nortel Networks Datasheet "MGM Multiwavelength Gain Module" (Nov. 3, 2000).

Takeda et al. "Active Gain Tilt Equalization by Preferentially 1.43$\mu$m– or 1.48$\mu$m– Pumped Raman Amplification" OSA Optical Amplifiers and their Applications, vol. 30, p. 101–105 (1999).

* cited by examiner

| I/O PIN | ASSIGNMENT | CODE | TYPE |
|---|---|---|---|
| 1 | LOSS OF INPUT | LOS | OUT |
| 2 | LOSS OF OUTPUT | LOP | OUT |
| 3 | LOSS OF INPUT (BAND 1) | LOS 1 | OUT |
| 4 | LOSS OF INPUT (BAND 2) | LOS 2 | OUT |
| 5 | LOSS OF OUTPUT (BAND 1) | LOP 1 | OUT |
| 6 | LOSS OF OUTPUT (BAND 2) | LOP 2 | OUT |
| 7 | ACTIVE CHANNEL OUT OF RANGE | COR | OUT |
| 8 | CHANNELS INACTIVE | LOC | OUT |
| 9 | RIPPLE OUT OF RANGE | ROR | OUT |
| 10 | GAIN OUT OF RANGE | GOR | OUT |
| 11 | DYNAMIC FILTER OUT OF RANGE WARNING | DFW | OUT |
| 12 | DYNAMIC FILTER OUT OF RANGE | DFOR | OUT |
| 13 | FILTER TEMPERATURE OUT OF RANGE | FTOR | OUT |
| 14 | USER DEFINED | OUT | OUT |
| 15 | RESET | RST | IN |
| 16 | DISABLE PUMPS | DSB | IN |

FIG. 21

OPTICAL NETWORK EQUIPMENT WITH OPTICAL CHANNEL MONITOR AND DYNAMIC SPECTRAL FILTER ALARMS

This application claims the benefit of provisional patent application No. 60/288,074, filed May 3, 2001.

BACKGROUND OF THE INVENTION

The present invention relates to fiber-optic communications networks, and more particularly, to optical network equipment such as optical amplifiers that generate optical channel monitor and dynamic spectral filter alarms.

Fiber-optic networks are used to support voice and data communications. In optical networks that use wavelength division multiplexing, multiple wavelengths of light are used to support multiple communications channels on a single fiber.

Optical amplifiers are used in fiber-optic networks to amplify optical signals. For example, optical amplifiers may be used to amplify optical data signals that have been subject to attenuation over fiber-optic paths. A typical amplifier may include erbium-doped fiber coils that are pumped with diode lasers. Raman amplifiers have also been investigated. Discrete Raman amplifiers may use coils of dispersion-compensating fiber to provide Raman gain. Distributed Raman amplifiers provide gain in the transmission fiber spans that are used to carry optical data signals between network nodes.

In a typical network installation, a number of optical cards are installed in an equipment rack. The cards may include optical amplifier cards and cards for other network equipment. Optical amplifier modules may be provided on the optical amplifier cards. The optical amplifier modules may have input/output (I/O) pins that are connected to electronic components on the cards. Output pins may be used to indicate the detection of alarm conditions. Input pins may be used as control pins for control signals.

When an alarm condition is detected, an optical amplifier module may activate an appropriate alarm pin. Alarms may include loss of signal alarms, loss of output power alarms, reflected power alarms, case temperature out of range alarms, etc. A single pin can be used to signal the presence of an alarm condition. Data that identifies the type of alarm that is present may then be provided using a data port.

Control pins may be used to receive disable commands that turn all pumps off while allowing electronic components to remain on, reset commands that initiate soft boot procedures for the amplifier module, and eye safe commands that turn the powers of pumps in the optical amplifier module to an eye safe level.

Alarms are generally not available for conditions relating to the spectrum of the optical signals being handled by the equipment module or the status of module components such as dynamic filters.

It is an object of the present invention to provide optical network equipment modules such as optical amplifiers that generate optical channel monitor and dynamic spectral filter alarms.

SUMMARY OF THE INVENTION

This and other objects of the invention are accomplished in accordance with the present invention by providing optical amplifier modules and other optical network equipment modules for use in fiber-optic communications links in fiber-optic networks. The modules may be installed in optical network equipment cards such as optical amplifier cards or other optical network equipment subsystems. The cards may be mounted in network equipment racks and may be used to support network operations at network nodes in the fiber-optic communications links.

The optical network equipment modules may include optical channel monitors. The optical channel monitors may be used to make spectral measurements. The results of the spectral measurements may be used to generate alarms. Alarms that may be generated include loss of input signal alarms, loss of output signal alarms, loss of input band alarms, loss of output band alarms, active channel out of range alarms, alarms indicating that certain channels are inactive, gain out of range alarms, gain ripple out of range alarms, output power ripple out of range alarms, ripple out of range warning alarms, etc.

The optical network equipment modules may also include dynamic spectral filters. The dynamic spectral filters may be used in optical amplifiers to modify optical gain and power spectra. The status of the dynamic filters may be monitored in real time using control units in the equipment modules. Information on the status of the dynamic filters may be used to generate alarms. For example, alarms may be generated such as dynamic filter out of range warning alarms, dynamic filter out of range alarms, dynamic filter temperature out of range alarms, etc.

Users may be provided with an opportunity to modify alarms or alarm parameters to create custom alarms related to the operation of the optical channel monitor and dynamic filter.

Further features of the invention and its nature and various advantages will be more apparent from the accompanying drawings and the following detailed description of the preferred embodiments.

BRIEF DESCRIPTION OF THE DRAWINGS

FIG. 21 is a table showing illustrative input/output pin assignments that may be used for an optical amplifier module in accordance with the present invention.

DETAILED DESCRIPTION OF THE PREFERRED EMBODIMENTS

Figure 1:
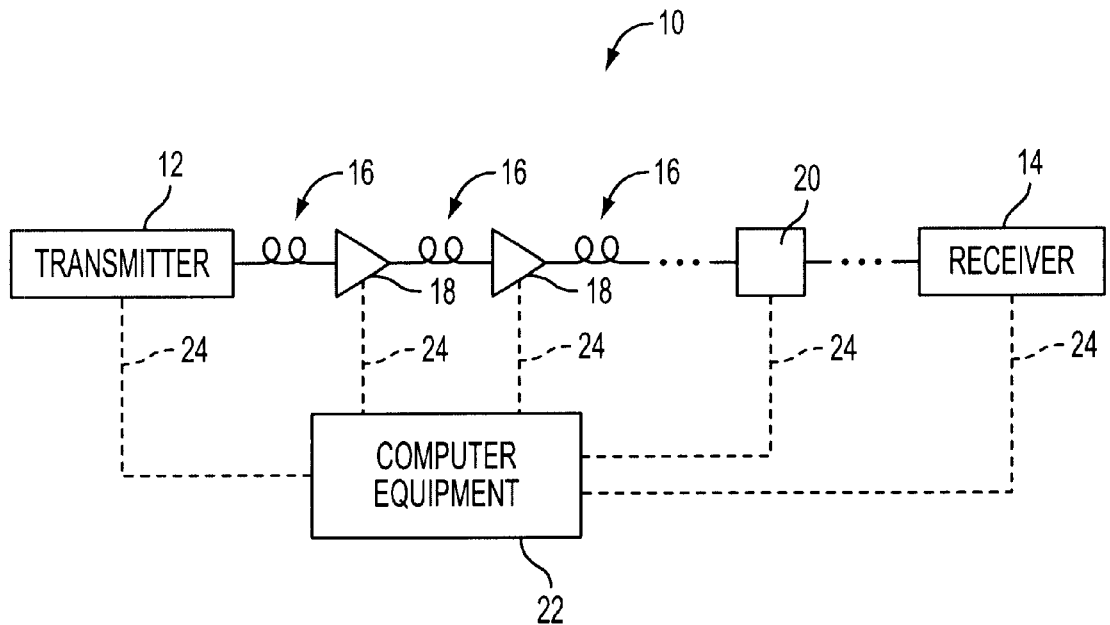
FIG. 1 is a schematic diagram of an illustrative fiber-optic communications link in accordance with the present invention.

An illustrative fiber-optic communications link 10 in an optical communications network in accordance with the present invention is shown in FIG. 1. A transmitter 12 may transmit information to a receiver 14 over a series of fiber links. Each fiber link may include a span 16 of optical transmission fiber. Fiber spans 16 may be on the order of 40–160 km in length for long-haul networks or may be any other suitable length for use in signal transmission in an optical communications network. Link 10 may be a point-to-point link, part of a fiber ring network, or part of any other suitable network or system.

The communications link of FIG. 1 may be used to support wavelength division multiplexing arrangements in which multiple communications channels are provided using multiple wavelengths of light. For example, the link of FIG. 1 may support a system with 40 channels, each using a different optical carrier wavelength. Optical channels may be modulated at, for example, approximately 10 Gbps (OC-192). The carrier wavelengths that are used may be in the vicinity of 1527–1605 nm. These are merely illustrative system characteristics. If desired, fewer channels may be provided (e.g., one channel), more channels may be provided (e.g., hundreds of channels), signals may be carried on multiple wavelengths, signals may be modulated at slower or faster data rates (e.g., at approximately 2.5 Gbps for OC-48 or at approximately 40 Gbps for OC-768), and different carrier wavelengths may be supported (e.g., individual wavelengths or sets of wavelengths in the range of 1240–1670 nm).

Optical amplifiers 18 may be used to amplify optical signals on link 10. Optical amplifiers 18 may include booster amplifiers, in-line amplifiers, and preamplifiers. Optical amplifiers 18 may be rare-earth-doped fiber amplifiers such as erbium-doped fiber amplifiers, amplifiers that include discrete Raman-pumped coils, amplifiers that include pumps for optically pumping spans of transmission fiber 16 to create optical gain through stimulated Raman scattering, semiconductor optical amplifiers, or any other suitable optical amplifiers.

Link 10 may include optical network equipment such as transmitter 12, receiver 14, and amplifiers 18 and other optical network equipment 20 such as dispersion compensation modules, dynamic filter modules, add/drop multiplexers, Raman pump modules, optical switches, etc.

Computer equipment 22 may be used to implement a network management system. Computer equipment such as computer equipment 22 may be located at network nodes and one or more network management facilities. As indicated by lines 24, the network management system may communicate with optical amplifiers 18, transmitter 12, receiver 14 and other optical network equipment 20 using suitable communications paths. The communications paths may be based on any suitable optical or electrical paths. For example, communications paths 24 may include service or telemetry channel paths implemented using spans 16, may include wired or wireless communications paths, may involve communications paths formed by slowly modulating the normal data channels on link 10 at small modulation depths, etc. Paths 24 may also be used for direct communications between amplifiers 18 and different pieces of optical network equipment 20.

Figure 2:
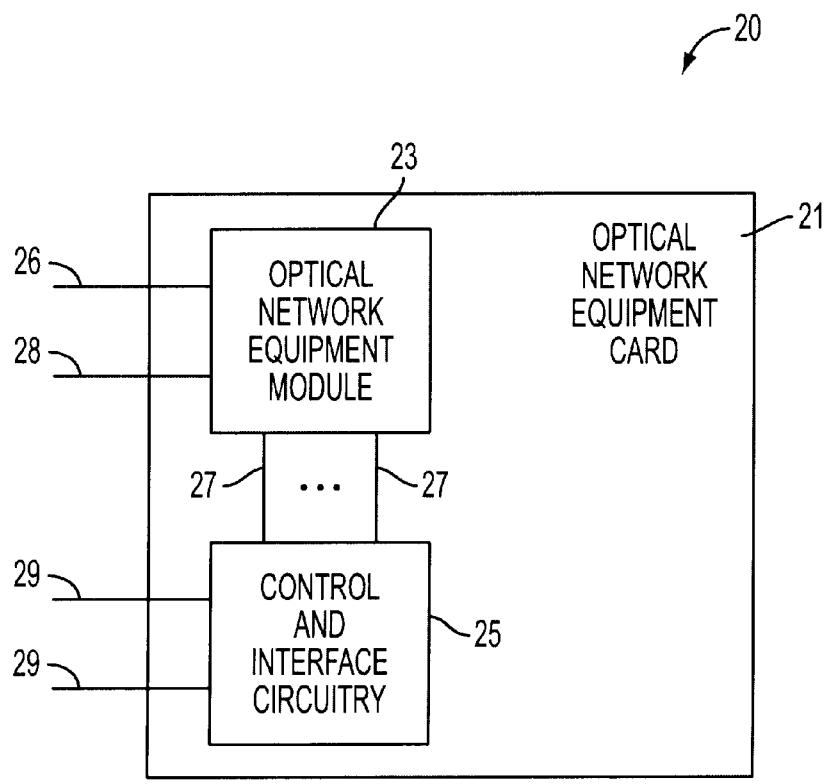
FIG. 2 is a schematic diagram of an illustrative optical network equipment subsystem in accordance with the present invention.

Illustrative optical network equipment 20 is shown in FIG. 2. In the example of FIG. 2, equipment 20 is shown as being implemented using an optical network equipment card 21. This is merely illustrative. Equipment 20 may be implemented using any subsystem platform, such as one or more cards or circuit packs, rack modules, boards, etc. Subsystem modules such as the card 21 of FIG. 2 may be mounted in a network equipment rack or other suitable housing. One or more racks or other equipment housing structures may be installed at a network node or hub or other network location to support operation of the network.

Card 21 may include one or more optical network equipment modules 23 and control and interface circuitry 25. Optical signals such as the optical data signals used to carry normal data traffic on various wavelength-division-multiplexing channels on link 10 may be provided to fiber input 26. Output signals that have been processed by module 23 of optical network equipment 20 may be provided at fiber output 28. For example, if optical network equipment 20 represents all or part of an optical amplifier, output signals may be provided at output 28 that are amplified versions of the optical signals provided at input 26. If desired, more than one fiber input and more than one fiber output may be used for module 23. The fiber inputs and outputs of cards 21 may be interconnected in an equipment rack using a fiber backplane, front-panel patch cords, and other suitable interconnection arrangements. Fiber inputs and outputs such as input 26 and output 28 may optically couple module 23 to link 10.

Optical network equipment modules such as module 23 may communicate with control and interface circuitry 25 or other suitable equipment in the network using electrical paths 27. Paths 27 may include one or more data ports and one or more sets of individual or grouped lines that connect electrical inputs and outputs associated with circuitry 25 to input/output (I/O) pins associated with module 23. Control and interface circuitry 25 may be used to coordinate the operation of module 23 and may communicate with the other equipment in the rack or other housing in which card 21 is installed using electrical input and outputs that are coupled to paths 29. Paths 29 may be connected to front-panel electrical connectors and the electrical backplane of the rack or other housing in which card 21 is mounted.

Figure 3:
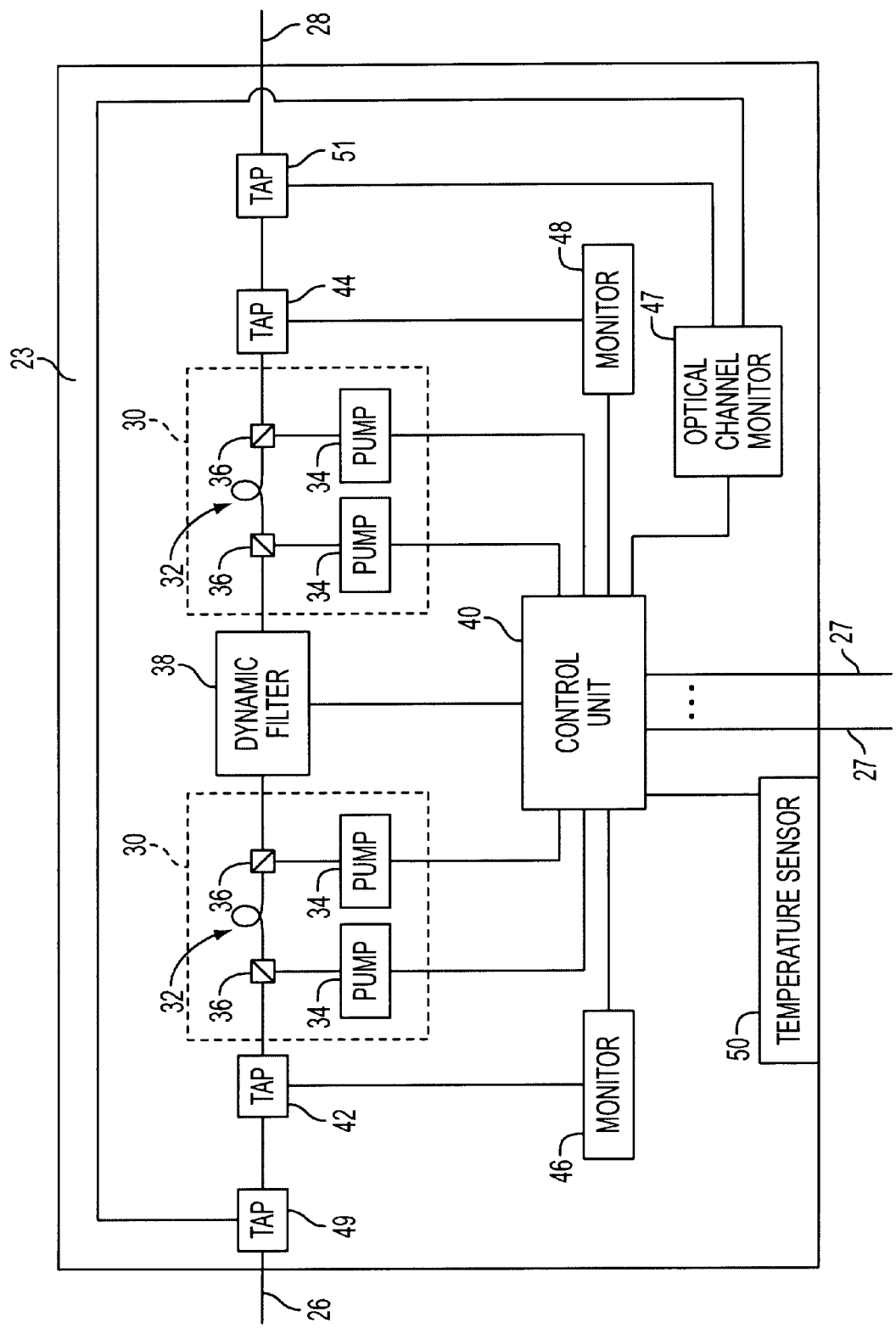
FIG. 3 is a schematic diagram of an illustrative optical amplifier module in accordance with the present invention.

An illustrative optical network equipment module 23 is shown in FIG. 3. The illustrative module 23 of FIG. 3 is an optical amplifier module that may be used in an optical amplifier 18. Other illustrative modules 23 include dynamic filter modules, optical channel monitor modules, filer modules with optical channel monitoring capabilities, dispersion compensation modules, transmitter modules, receiver modules, switch modules, add/drop multiplexer modules, etc. In the example of FIG. 3, optical amplifier module 23 may receive optical signals from a span of fiber 16 at fiber input 26. Corresponding amplified output signals may be provided at fiber output 28 for launching on a subsequent span of fiber 16.

Optical gain may be provided by gain stages 30. Gain stages 30 may include optically-pumped erbium-doped fiber 32 or other rare-earth-doped fiber or Raman-pumped fiber. Fiber 32 may be pumped using one or more pumps 34. Pumps 34 may be based on one or more laser diodes operating at wavelengths of 980 nm or 1480 nm or other suitable wavelengths or any other suitable sources of pump light. Pump light from pumps 34 may be coupled into fiber coils 32 using pump couplers 36. Pump couplers 36 may be wavelength-division-multiplexing couplers or any other suitable couplers. The pumping configuration shown in FIG. 3 involves both copumping and counterpumping. If desired, however, coils such as coils 32 may be only copumped or only counterpumped.

Although amplifier module 23 of FIG. 3 is shown as having two coils of erbium-doped fiber, this is merely illustrative. Modules 23 may have one, two, three, four, five, or more coils of erbium-doped fiber or other rare-earth-doped fiber. In amplifiers 18 and other equipment subsystems 20 that include optically-pumped Raman gain stages or gain stages based on other gain media, one, two, three, or more of such gain stages may be provided. Any suitable number of erbium-doped fiber gain stages, Raman gain stages, semiconductor gain stages, or other gain stages may be combined in any suitable order. Amplifier topologies other than the amplifier topology of FIG. 3 may be used if desired.

Dynamic filter 38 may be used to modify the gain and power spectra of amplifier 18. Dynamic filter 38 may be referred to as a dynamic gain equalization or dynamic gain flattening filter, because dynamic filter 38 may be used alone or in combination with a static spectral filter to flatten the gain spectrum of amplifier 18. Dynamic filter 38 may be used to produce any desired spectral shape. If desired, a module 23 without an optical gain stage may be provided with a dynamic filter. This type of module 23 may be optically coupled to a link 10 or an amplifier 18. For clarity, the present invention is sometimes described in connection with modules 23 that include both optical gain stages and a dynamic filter.

Dynamic filter 38 may be formed using any suitable filter arrangement capable of producing a desired controllable loss (or gain) spectrum. Suitable filters may be based on microelectromechanical system (MEMS) devices, may be based on acoustooptic devices (e.g., acoustooptic fiber devices), may be based on thermo-optic arrayed waveguide devices, may be based on liquid crystals, may use electrooptic devices, may be based on semiconductor devices, may be based on electrooptically-induced or mechanically-induced gratings, or may be based on any other suitable dynamic filter arrangement.

Fiber-based filters may be based on tunable fiber Bragg grating mirrors or tunable fiber Bragg gratings that couple light into a fiber cladding mode. Fiber Bragg gratings may be formed by using acoustooptic modulation, by physically-inducing stresses (e.g., using a periodic comb structure that presses into the fiber), by etching into the fiber, or by using ultraviolet light and masks to produce periodic changes in the refractive index of the fiber. Fiber Bragg gratings may be tuned using heat or stress (e.g., stretching). These techniques are merely illustrative. Any suitable fiber-based dynamic filters 38 may be used if desired. Filters 38 may include filter elements that operate in transmission or reflection. Circulators may be used to allow reflective filter elements to be used in filters 38 that are operated in transmission. Such circulators may be considered to be part of the filters 38.

In general, various additional components may be positioned at locations along the main fiber path through a module 23. These components may include isolators, taps and photodetectors for optical monitoring, filters (e.g., dynamic and static spectral filters), wavelength-division-multiplexing couplers, attenuators, dispersion-compensating elements such as dispersion-compensating fiber, gain stages, pumps, pump couplers, optical channel monitors, optical switches, etc. The operation of the components and pumps 34 and dynamic filter 38 may be controlled using control unit 40.

Control unit 40 may be based on any suitable control circuitry and may include one or more microprocessors, microcontrollers, digital signal processors, field-programmable gate arrays or other programmable logic devices, application-specific integrated circuits, digital-to-analog converters, analog-to-digital converters, analog control circuits, memory devices, etc. Control unit 40 may include communications circuitry that supports communications between control unit 40 and control and interface circuitry 25 of FIG. 2 over electrical paths such as paths 27. Such communications may include, for example, RS-232 communications, digital communications, analog communications, parallel data communications, serial data communications, communications involving input/output lines and pins, etc.

Taps 42 and 44 may be used to tap a fraction (e.g., 2%) of the light propagating through module 23. Tapped light from tap 42 may be measured using optical monitor 46. Tapped light from tap 44 may be measured using monitor 48. Monitors 46 and 48 may be based on photodetectors or any other suitable optical monitoring arrangement. Transimpedance amplifiers in monitors 46 and 48 or in control unit 40 may be used to convert current signals from the photodetectors in monitors 46 and 48 into voltage signals for processing by analog-to-digital converters or other suitable processing circuitry. The processing circuitry may be located in monitors 46 and 48 or in control unit 40.

With the arrangement of FIG. 3, tap 42 and monitor 46 may be used to measure the total input power of the signals received at input 26. Tap 44 and monitor 48 may be used to measure the total output power of module 23 at output 28. Control unit 40 may use the input and output power measurements from taps and monitors in module 23 to suppress gain transients. When signal and gain fluctuations are detected using the taps and monitors, control unit 40 may control the power of the pump light produced by pumps 34 to ensure that the gain or output power of module 23 remains constant.

Module 23 may have an optical channel monitor 47 or a module 23 without a gain stage may be provided with an optical channel monitor. This type of module 23 may be optically coupled to a link 10 or an amplifier 18. For clarity, the present invention is sometimes described in the context of modules 23 that include both optical gain stages and an optical channel monitor.

Optical channel monitor 47 may be used to measure the spectrum of optical signals in module 23. For example, optical channel monitor 47 may be used to measure the power spectrum of input signals to module 23 that are tapped using optical tap 49. Optical channel monitor 47 may also be used to measure the power spectrum of output signals that are tapped using optical tap 51.

Optical channel monitor 47 may be based on an arrangement having a dispersive element coupled to a photodiode or photodiode array. The dispersive element may be, for example, a grating. The grating may be rotated (for example) using a rotating stage or other suitable arrangement. If desired, the optical channel monitor may use a fixed dispersive element such as a fixed grating. Light that has been dispersed by the fixed dispersive element may be spatially analyzed using a linear diode array or other suitable spatially-sensitive detector arrangement. If desired, more than one dispersive element may be used. A Fabry-Perot etalon having an etalon length that may be varied using mechanical positioners may also be used for the optical spectrum analyzer. Optical channel monitors may also be based on other tunable filters (e.g., thermooptically-tuned filters or MEMS-based filters) and photodetectors. These are merely illustrative arrangements. Any suitable spectrum analyzer arrangement may be used for optical channel monitor 47 if desired.

In the example of FIG. 3, optical channel monitor 47 has two inputs. This is merely illustrative. Two separate optical channel monitors may be used to monitor input and output power spectra or a single one-port optical channel monitor may be provided with an optical switch that allows the measurement of both input and output spectra. When both input and output spectra are measured, the gain spectrum of module 23 may be determined. If desired, a single-port optical channel monitor may be used to measure the output power spectrum of module 23 without measuring the input power spectrum. These are merely illustrative examples. Any suitable optical spectral monitoring arrangement may be used. If desired, an optical channel monitor may be used by module 23 that is separate from module 23 and that is optically and electrically coupled to a module 23 having a gain stage 30. Such an optical channel monitor module 23 may, for example, be mounted on the same card or the same rack or housing as the amplifier module 23.

Some of the components used in module 23 may be temperature controlled components. For example, optical channel monitor 47 may be temperature controlled using a temperature controller. The temperature controller may be based, for example, on a Peltier effect thermoelectric cooling element. The temperature of dynamic filter 38, erbium-doped fiber coils 32, and pumps 34 may also be temperature controlled. The temperature of the temperature-controlled components may be maintained at any suitable temperature. For example, temperature-controlled components may be maintained at room temperature, at a temperature above room temperature (e.g., 10–20 degrees C. above room temperature), at the maximum recommended operating temperature of module 23, or any other suitable temperature.

Temperature sensors may be used to monitor the temperature of pumps 34, dynamic filter 38, optical channel monitor 47, fiber 32, and other suitable portions of module 23 such as the case or other portion of the housing or mounting structures of module 23. An illustrative temperature sensor 50 that may be used by control unit 40 to monitor the temperature of the case or other mounting structure of module 23 is shown in FIG. 3.

Figure 4:
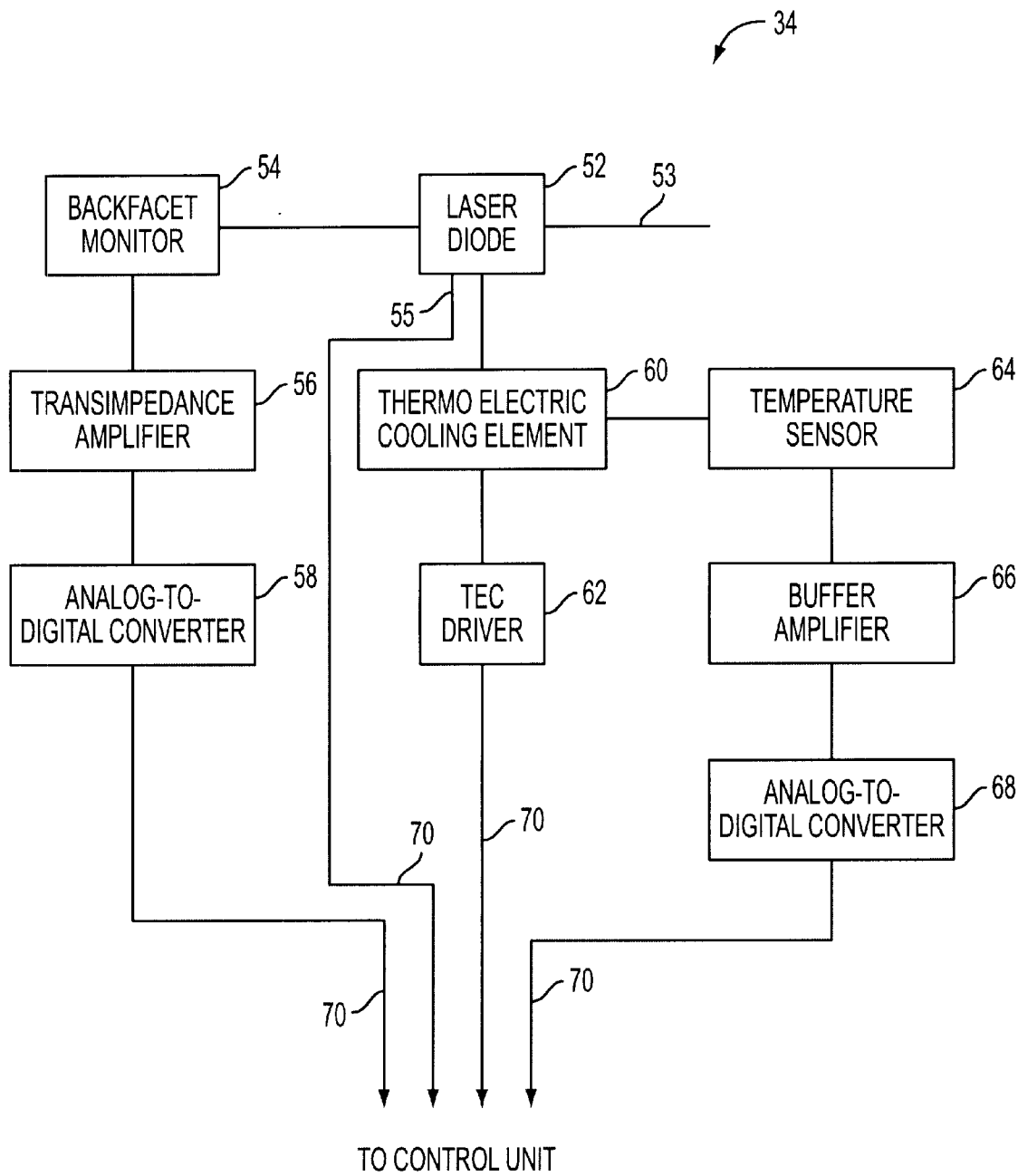
FIG. 4 is a schematic diagram of an illustrative pump in accordance with the present invention.

An illustrative pump 34 that may be used to provide optical pumping in equipment such as amplifier module 23 is shown in FIG. 4. Pump light may be generated by laser diode 52. The pump light may be provided to a pump coupler 36 (FIG. 3) over fiber 53. Drive current for laser diode 52 may be provided to laser diode 52 at input 55 from a pump driver in control unit 40.

Laser diode 52 may use a backfacet monitoring configuration. With this type of arrangement, a fraction of the pump light exiting laser diode 52 is directed to a backfacet monitor 54 through the back facet of laser diode 52. The power of the backfacet light may be proportional to the power of the pump light exiting diode 52 at fiber 53, so backfacet monitor 54 may be used as a power meter for laser diode 52. Transimpedance amplifier 56 may be used to convert current signals from backfacet monitor 54 into voltage signals that may be digitized by analog-to-digital converter 58.

The temperature of laser diode 52 may be regulated using a temperature sensing and control arrangement. Laser diode 52 may be mounted on a temperature controller such as thermoelectric cooling (TEC) element 60. TEC element 60 may be a Peltier effect device. When current is applied to TEC element 60 in one direction by TEC driver 62, TEC element 60 cools laser diode 52. When current is applied to TEC element 60 in the opposite direction by TEC driver 62, TEC element 60 heats laser diode 52.

The temperature of laser diode 52 and TEC element 60 may be monitored using temperature sensor 64. Temperature sensor 64 may be based on a thermistor, a thermocouple, or any other suitable temperature monitoring device. Temperature sensor 64 may be thermally coupled to laser diode 52 and thermoelectric cooling element 60. A heat sink or other suitable device may be used to thermally couple temperature sensor 64, laser diode 52, and thermoelectric cooling element 60. This type of temperature control and sensing arrangement may be used for any suitable temperature-controlled component in module 23.

An optional buffer amplifier 66 may gather temperature readings from temperature sensor 64. The output of buffer amplifier 66 may be digitized using analog-to-digital converter 68.

Data signals from analog-to-digital converters 58 and 68 (which may be part of the same unit) may be provided to a processor or other appropriate circuitry within control unit 40 over paths 70. Drive signals for thermoelectric cooling element 60 and laser diode 52 may be provided from control unit 40 over paths 70.

Figure 5:
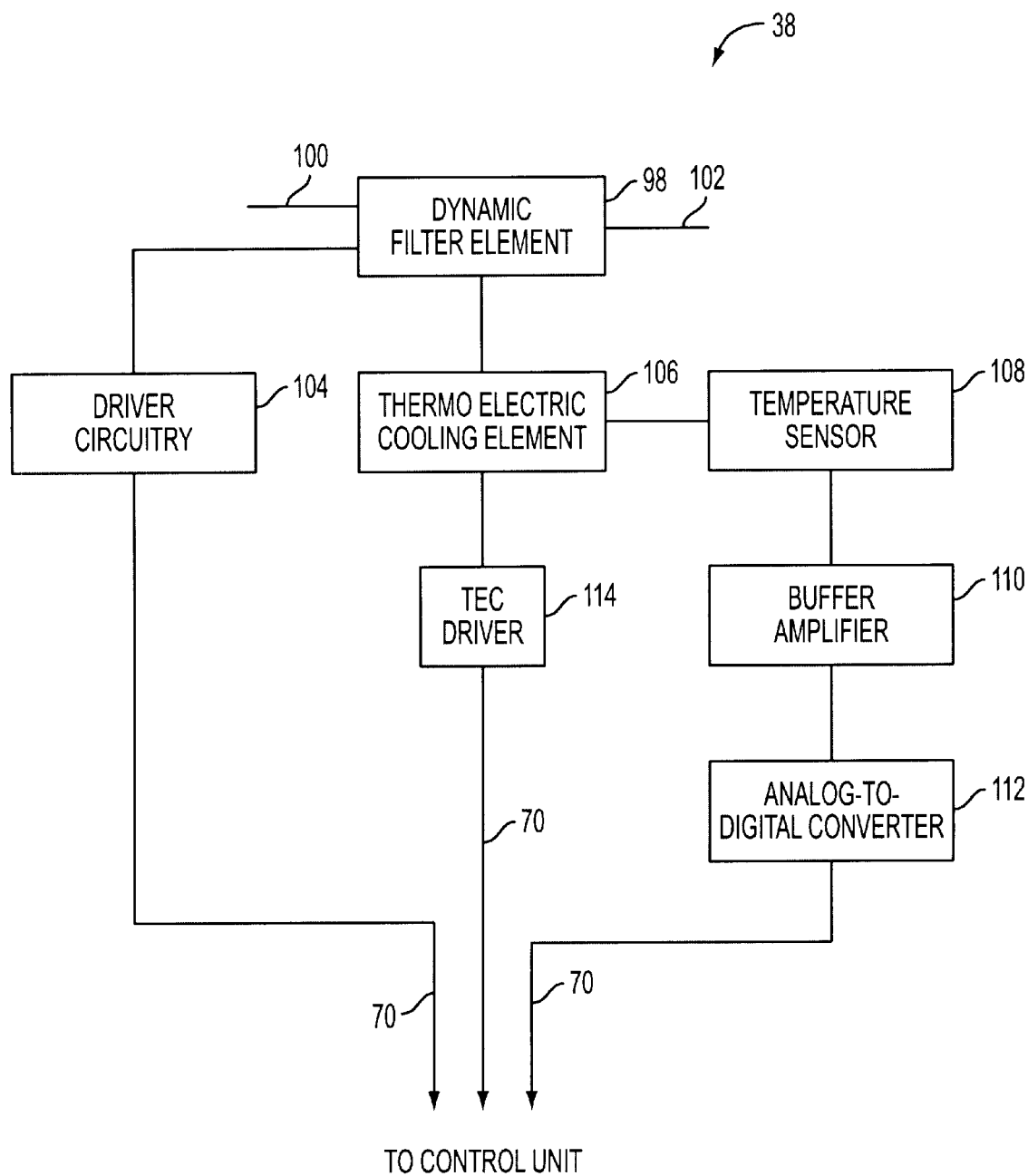
FIG. 5 is a schematic diagram of an illustrative dynamic filter in accordance with the present invention.

An illustrative dynamic filter 38 that may be used to spectrally modify the optical signals passing through amplifier module 23 is shown in FIG. 5. Dynamic filter element 98 may be used for spectrally filtering light between input fiber 100 and output fiber 102. The spectrum that is produced by dynamic filter element 98 may be controlled using driver circuitry 104. For example, if dynamic filter element 98 is a MEMS device, the spectrum that is produced by dynamic filter element 98 may be controlled by the AC or DC voltage signals produced at the output of driver circuitry 104. Driver circuitry 104 may be controlled by control unit 40 (FIG. 3) over appropriate paths 70. Driver circuitry 104 or other suitable circuitry coupled to element 98 may be used to monitor the state of filter element 98. Optical channel monitor 47 may be integrated with element 98 if desired.

The temperature of dynamic filter element 98 may be regulated using a temperature sensing and control arrangement. Dynamic filter element 98 may be mounted on a temperature controller such as thermoelectric cooling (TEC) element 106. TEC element 106 may be a Peltier effect device. When current is applied to TEC element 106 in one direction by TEC driver 114, TEC element 106 cools element 98. When current is applied to TEC element 106 in the opposite direction by TEC driver 114, TEC element 106 heats element 98.

The temperature of dynamic filter element 98 may be monitored using temperature sensor 108. Temperature sensor 108 may be based on a thermistor, a thermocouple, or any other suitable temperature monitoring device. Temperature sensor 108 may be thermally coupled to element 98 and thermoelectric cooling element 114. A heat sink or other suitable device may be used to thermally couple temperature sensor 108, element 98, and thermoelectric cooling element 106.

An optional buffer amplifier 110 may gather temperature readings from temperature sensor 106. The output of buffer amplifier 110 may be digitized using analog-to-digital converter 112.

Data signals from analog-to-digital converters such as analog-to-digital converter 112 and any such converter used to monitor the drive signals or other signals associated with the operation of element 98 may be provided to a processor or other appropriate circuitry within control unit 40 over paths 70. Driver 114 may be controlled based on signals provided from control unit 40 using paths 70.

Figure 6:
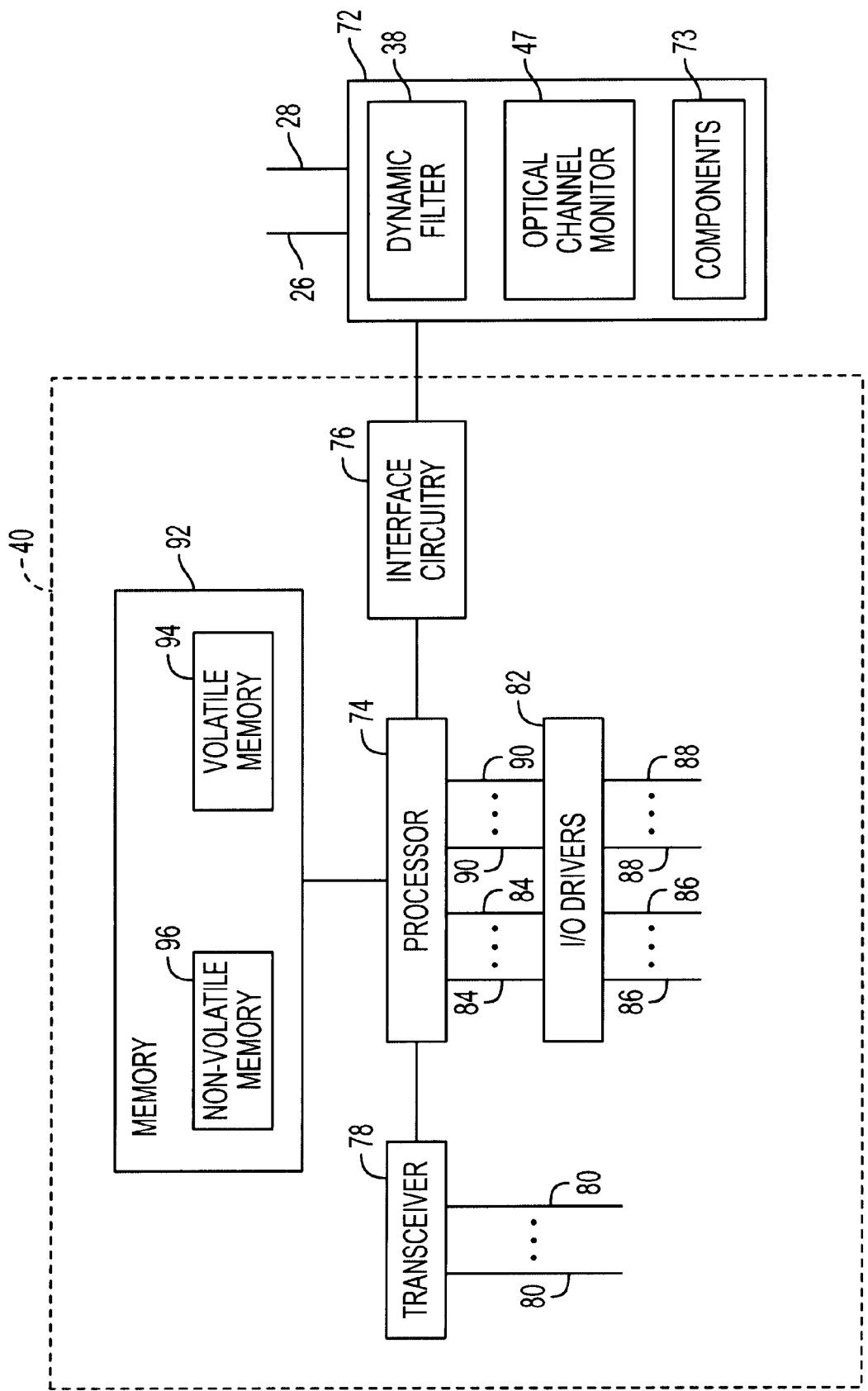
FIG. 6 is a schematic diagram of control circuitry associated with an illustrative optical network equipment module in accordance with the present invention.

A schematic diagram of circuitry that may be used by an illustrative control unit 40 in controlling the components of a given optical network equipment module 23 is shown in FIG. 6. Module components 72 of FIG. 6 may include dynamic filter 38, optical channel monitor 47, and other components 73 described in connection with FIG. 3 such as isolators, taps and photodetectors for optical monitoring, optical channel monitors, filters (e.g., dynamic and static spectral filters), wavelength-division-multiplexing couplers, attenuators, dispersion-compensating elements such as dispersion-compensating fiber, gain stages, pumps, pump couplers, and other gain stage components, optical switches, temperature sensors, etc.

Fiber inputs and outputs such as fiber inputs and outputs 26 and 28 that are optically coupled to components 72 and other suitable inputs and outputs may be used to handle optical input and output signals. Components 72 may also have electrical inputs and outputs. Components 72 may be electrically coupled to processor 74 via interface circuitry 76. Processor 74 may be based on any suitable control electronics and may include one or more microprocessors, microcontrollers, digital signal processors, field-programmable gate arrays or other programmable logic devices, application-specific integrated circuits, digital-to-analog converters, analog-to-digital converters, analog control circuits, memory devices, etc. Interface circuitry 76 may include circuitry for generating drive signals for components 72 and for processing signals from components 72. For example, interface circuitry 76 may include application-specific integrated circuits, digital-to-analog converters, analog-to-digital converters, amplifiers (e.g., operation amplifiers), etc.

Processor 74 may use transceiver 78 to communicate with control and interface circuitry 25 of FIG. 2. Transceiver 78 may support any suitable communications over lines 80 such as analog communications, digital communications, serial communications, and parallel communications. Lines 80 may be used to form a data port. Transceiver 78 may use the data port to support RS-232 communications, Ethernet communications, or other suitable communications.

Processor 74 may also handle communications using I/O drivers 82. Drivers 82 may be used to provide a more direct and dedicated signal path between control unit 40 and control and interface circuitry 25 or other equipment than is provided by the data port supported using lines 80. Processor 74 may supply one or more output signals on output lines 84. The output signals on line 84 may be buffered or amplified by output drivers in I/O drivers 82 that are connected to one or more output pins 86. Processor 74 may receive one or more input signals on input pins 88. The input signals on input pins 88 may be buffered and amplified by input drivers in I/O drivers 82 and provided to input lines 90. Pins 86 and 88 and lines 80 may be connected to control and interface circuitry 25 using paths 27 of FIG. 2. A suitable connector such as a DB25 connector may be used to connect outputs and inputs 86 and 88 and lines 80 to paths 27 if desired.

Control unit 40 may have memory 92. Memory 92 may include volatile memory 94 and non-volatile memory 96. Memory 94 may include dynamic random-access memory, static random-access memory, or any other suitable random-access memory. Non-volatile memory 96 may include programmable read-only memory such as erasable read-only memory, electrically-erasable read-only memory, flash memory, or any other suitable memory. The information that is stored in control unit 40 may include instructions and data for operating processor 74 and other components in control unit 40 and module 23. The instructions and data include information (sometime referred to herein as "configuration data") that is used to configure module features such as pin assignments, alarm thresholds and other alarm parameters, and other operational parameters. The configuration data may include default configuration data for configuring control unit 40 and module 23 to perform default functions and may include user-defined customized configuration data for configuring control unit 40 and module 23 to perform user-defined functions.

Configuration data and other information that governs the operation of module 23 may be stored in non-volatile memory 96 or other storage in control unit 40 (e.g., storage in a programmable logic device). When module 23 is initially booted up, some or all of the information from the non-volatile memory 96 or other storage in control unit 40 may be transferred into memory 94 or other suitable run-time storage location for use by processor 74 and the other circuitry of FIG. 6.

Pins 86 and 88 may be used to support any suitable types of dedicated input and output signals. For example, output pins 86 may be used for alarms or other suitable alerts, interrupts, or output signals. Input pins 88 may be used for control signals, interrupts, or other suitable signals. These are merely illustrative examples. Pins 86 and 88 may be used for any suitable dedicated input and output signal communications between processor 74 and control and interface circuitry 25 or other suitable circuitry. If desired, some I/O pins may be bidirectional and may serve as both input pins and output pins.

Control unit 40 may use paths 27 to support alarms based on measurements from optical channel monitor 47, status information on the operation of dynamic filter 38, information on the operating temperature of optical channel monitor 47, erbium-doped fiber 32, dynamic filter 38, or any other suitable data related to the operation of module 23.

Figure 7:
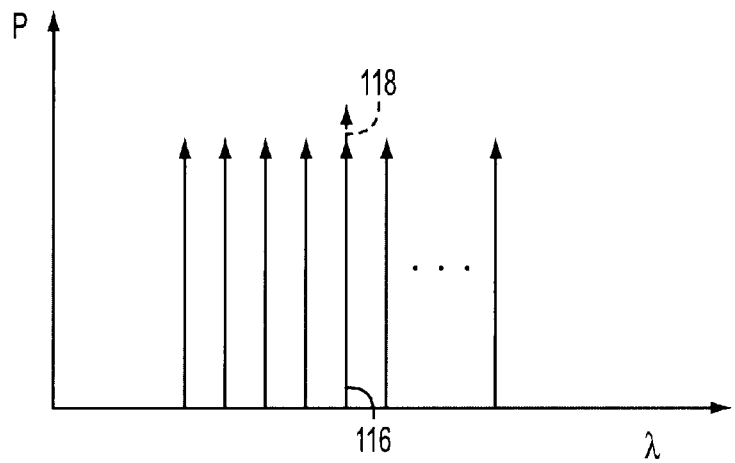
FIG. 7 is a graph showing how the power of a given optical channel may fluctuate.

As an example, control unit 40 may generate an alarm when the power of a given channel fluctuates. A channel power fluctuation may indicate a problem in the operation of link 10 that should be investigated. As shown in FIG. 7, the power of channel 116 may vary by an amount represented by dotted line portion 118. The powers of the optical signal channels shown in the spectrum of FIG. 7 may be measured at the input or output of amplifier 18 or other module 23 using optical channel monitor 47. The information on the signal powers of each of the channels may be processed by control unit 40.

Figure 8:
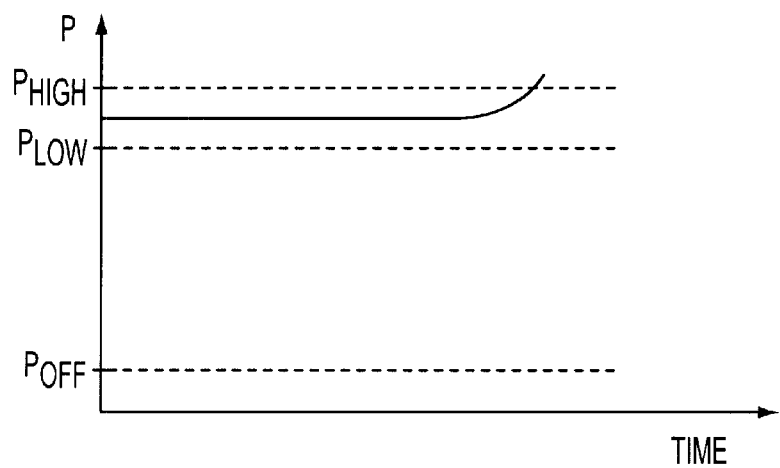
FIG. 8 is a graph showing how the power of the fluctuating channel of FIG. 7 may vary as a function of time in relation to alarm limits that have been established in accordance with the present invention.

The measured power of channel 116 is plotted as a function of time in FIG. 8. As shown in FIG. 8, thresholds or other limits or alarm parameters may be established and this information may be stored as configuration data in memory 92 by control unit 40. In the example of FIG. 8, three alarm thresholds have been established—$P_{HIGH}$, $P_{LOW}$, and $P_{OFF}$. These thresholds may be stored, for example, in memory 92. When the signal power for a channel such as channel 116 is determined to be above $P_{OFF}$, the channel may be considered to be active. When the power of an active channel rises above the power $P_{HIGH}$ or falls below power $P_{LOW}$, control unit 40 may generate an appropriate alarm. For example, control unit 40 may generate an "active channel out of range" alarm. The alarm may be provided to control and interface circuitry 25 or other suitable equipment using lines 27 (e.g., using one or more I/O pins or port 80). Information on which channel is out of range may also be provided. One channel, some channels, or all channels in link 10 may be monitored. This type of alarm may be used to monitor whether the channels of link 10 are operating within a normal power range.

If desired, control unit 40 may use optical channel monitor 47 to monitor the frequency with which channel powers fluctuate. Rapid fluctuations (noise) may require correction or may be indicative of an impending failure. Any suitable technique may be used to characterize channel power noise. For example, a count may be made of how many channel power fluctuations deviate from a baseline or long term average power or predefined power level in a given time, noise spectrum measurements may be made, thresholds may be established that cause alarms to be generated when a channel fluctuates by more than a given amount in a given time, or other suitable approaches may be used. Channel power noise or fluctuation measurements may be made for one channel, some channels, or all channels in link 10. Alarms may be generated when noise criteria or fluctuation levels have been met or exceed.

Figure 9:
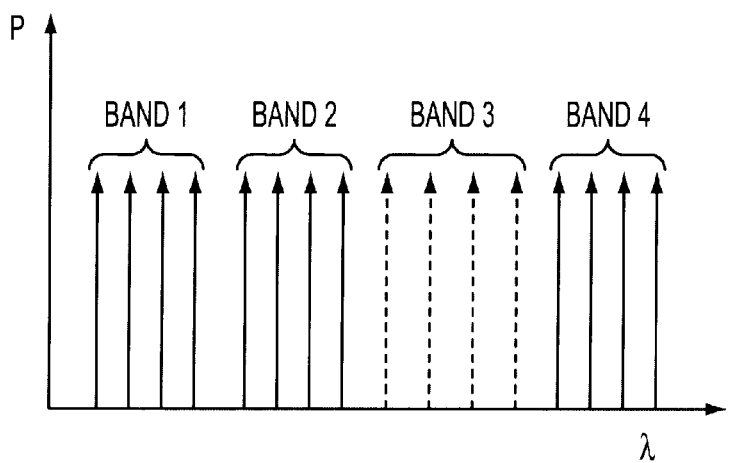
FIG. 9 is a graph showing how a band of channels within the signal band on a link may be dropped.

If desired, the status of a band of signals may be monitored. This approach may be advantageous if signals on link 10 are divided into a number of individual bands or if a particular group of signals is expected to be subject to power fluctuations. As shown in the example of FIG. 9, the signal band of an illustrative link 10 may be divided into four bands, each of which contains four channels. All or most of the channels in a band may suddenly be dropped (or added), as indicated by the dotted lines for the channels in band 3 in the FIG. 9 example.

Control unit 40 may use optical channel monitor 47 to monitor the spectrum of FIG. 9. When the channels in band 3 are dropped, an appropriate alarm may be generated. The alarm may indicate that a band of signals has been dropped. If input signals are being monitored, the alarm may be a loss of input signal alarm. If output signals are being monitored, the alarm may be a loss of output signal alarm. A different alarm may be associated with each of the different bands. For example, if the signals of band 3 are lost, control unit 40 may generate a loss of signal alarm that is specifically associated with band 3. The alarm may be generated regardless of the status of the channels in the other bands. This information may be used by personnel such as network management system personnel in evaluating the status of the network.

Loss of signal alarms for various channels or bands and other alarms may be provided by using separate pins 84 and associated separate output lines 86. If desired, loss of signal alarms for various channels or bands and other alarms may be provided by using one or more lines (e.g., one or more of lines 80 or output lines 86) to indicate the presence of an alarm condition while using one or more lines (e.g., one or more of lines 80) to provide information on which alarm condition or conditions are present in the form of serial or parallel alarm data.

Figure 10:
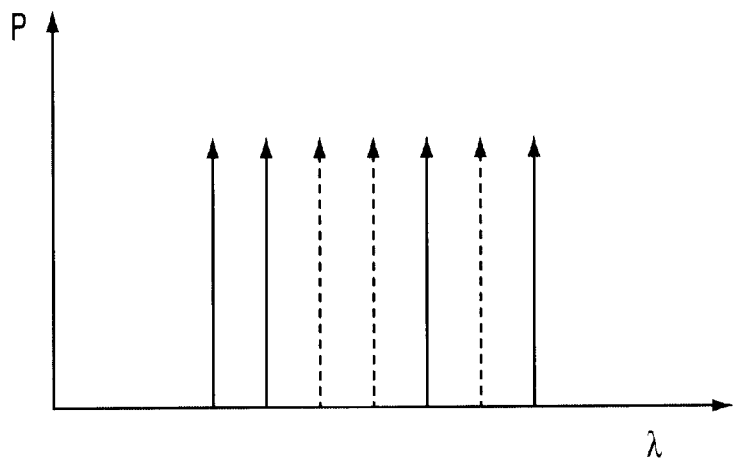
FIG. 10 is a graph showing how certain channels on a link may be added or dropped.
Figure 11:
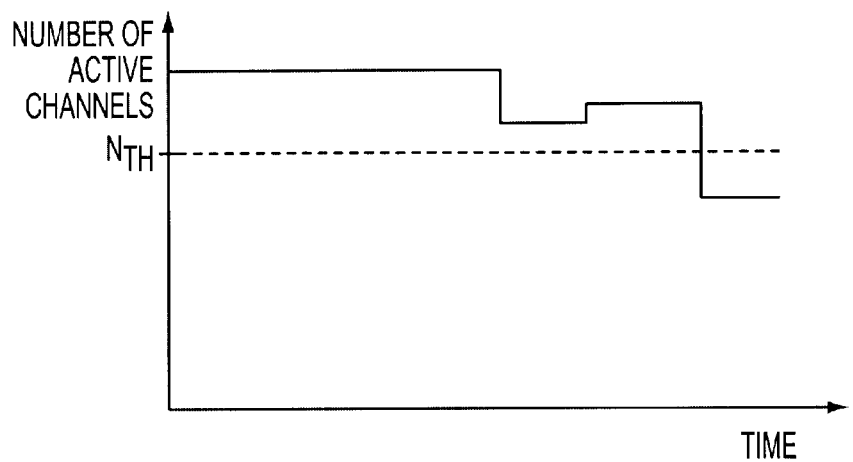
FIG. 11 is a graph in which the number of channels in a given link is plotted as a function of time relative to a threshold value that has been established in accordance with the present invention.

Another suitable alarm that may be generated by a module 23 in response to optical channel monitor spectrum measurements is illustrated in connection with FIGS. 10 and 11. As shown by the dotted line channels in the signal band spectrum of FIG. 10, the number of active channels in the signal band may vary as a function of time. Channels may, for example, be added due to a system reconfiguration or may be dropped due to a reconfiguration or an accidental fiber cut. Control unit 40 may monitor the number of channels that are active as a function of time, as shown in the graph of FIG. 11. Channels may be considered to be active when the signal power for a channel that is measured using optical channel monitor 47 is above a given threshold (e.g., $P_{OFF}$). The values of the thresholds and other alarm parameters such as the value of $P_{OFF}$ may be adjusted by personnel at the network management system or any other suitable personnel before or after module 23 has been installed in link 10 and corresponding threshold configuration data may be stored in memory 92.

In the example of FIG. 11, a threshold of $N_{TH}$ has been established. When control unit 40 determines that the number of active channels in module 23 has passed the threshold $N_{TH}$, control unit 40 may generate an appropriate alarm. This type of approach may be used to indicate when the number of active channels in link 10 that are being handled by module 23 has fallen below a given number (e.g., too many channels have been dropped). An alarm may also be generated when the number of channels surpasses a predefined number or when the number of channels falls within or does not fall within a specified range.

The amount of variation or ripple in a measured power spectrum may be measured and the results of this measurement used to generate alarms. The spectrum that is analyzed to generate this type of alarm may be an input power spectrum, an output power spectrum, or other suitable measured spectrum associated with the network equipment.

Figure 12:
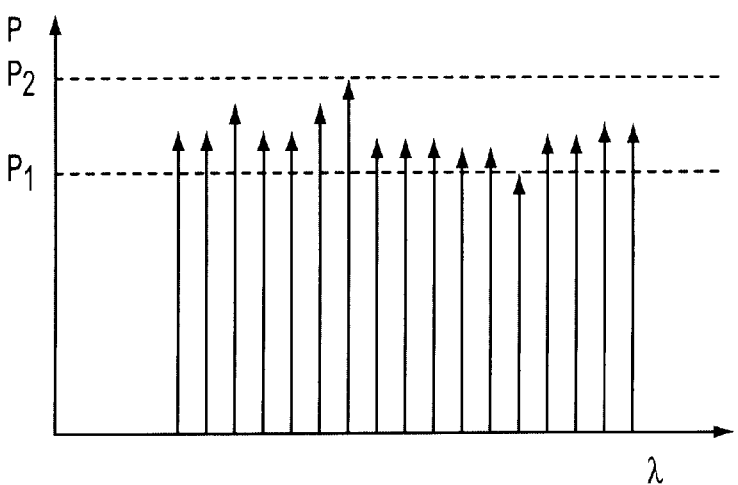
FIG. 12 is a graph of an illustrative optical channel power spectrum that is plotted in relation to threshold power levels that have been established in accordance with the present invention.

An illustrative power spectrum that may be measured by optical channel monitor 47 is shown in FIG. 12. In the example of FIG. 12, the channel with the most power has a power of $P_2$ and the channel with the least power has a power of $P_1$. These values may be used to determine the maximum spread ($P_2-P_1$) between the highest and lowest channel powers. The spread or other suitable value derived from the spectrum of FIG. 12 may be used by control unit 40 to determine whether the power ripple of module 23 is too large. If the magnitude of the signal power spectrum ripple is out of range, a power ripple out of range alarm may be generated.

Figure 13:
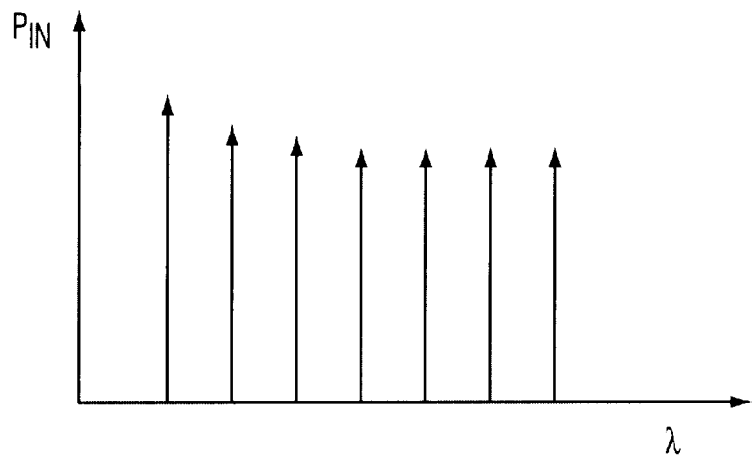
FIG. 13 is a graph of an illustrative optical channel input power spectrum of the optical data signals that may be provided to an optical amplifier in accordance with the present invention.
Figure 14:
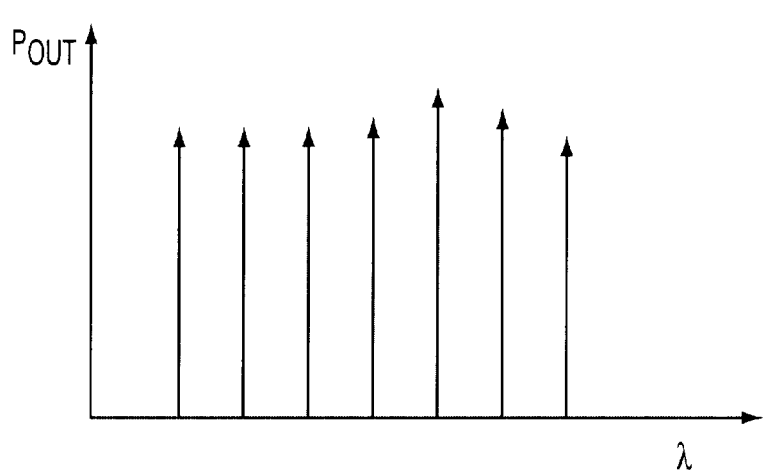
FIG. 14 is a graph of an illustrative optical channel output power spectrum that may be produced at the output of an optical amplifier in response to the input power spectrum of FIG. 13 in accordance with the present invention.

This approach may also be used to generate gain ripple out of range alarms, as described in connection with FIGS. 13–15. An illustrative input spectrum $P_{IN}$ of the type that may be measured at the input of an amplifier 18 or other equipment is shown in FIG. 13. An illustrative corresponding output spectrum $P_{OUT}$ is shown in FIG. 14. Control unit 40 may measure the input spectrum of FIG. 13 and the output spectrum of FIG. 14 and may calculate the corresponding gain spectrum of amplifier 18 or other equipment 20 by dividing the output power spectrum by the input power spectrum. The gain spectrum in this example is shown in FIG. 15.

Figure 15:
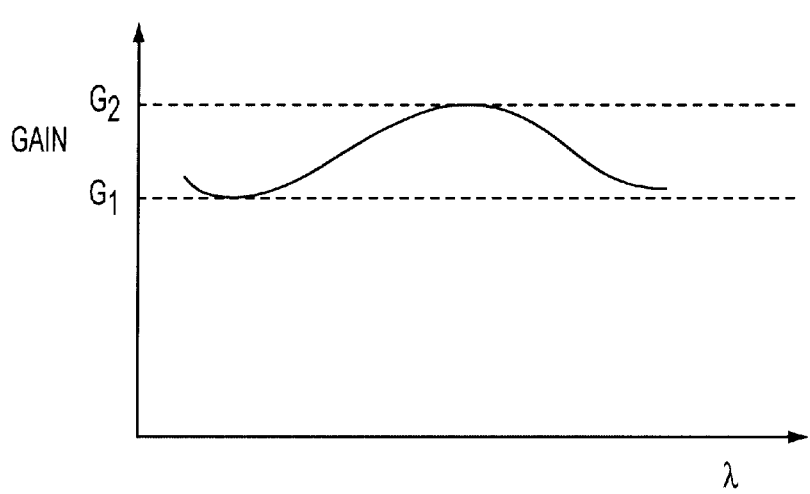
FIG. 15 is a graph of the gain spectrum that may be measured for an optical amplifier of the type used to amplify the signals of FIG. 13 to produce the output power spectrum of FIG. 14 in accordance with the present invention.

As shown in FIG. 15, the maximum and minimum gains $G_2$ and $G_1$ may be measured and the corresponding gain ripple or spread between these values may be determined. If the gain ripple is more than a predefined ripple threshold, control unit 40 may generate a gain ripple out of range alarm.

Figure 16:
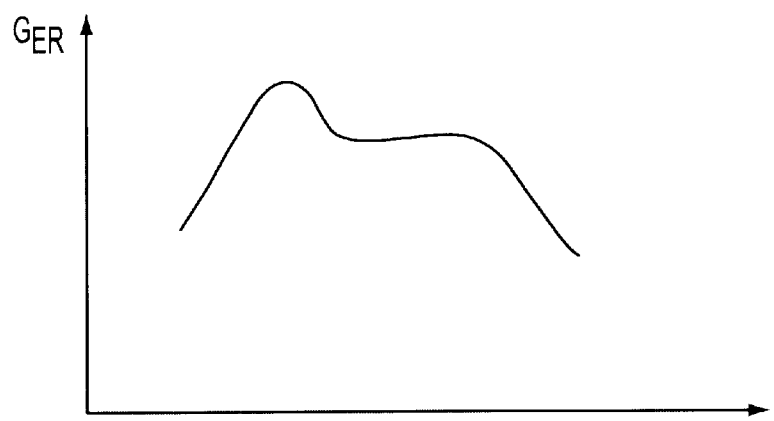
FIG. 16 is a graph of an illustrative gain spectrum for an erbium-doped fiber gain stage in an optical amplifier in accordance with the present invention.

The gain of gain stages such as gain stages 30 of FIG. 3 is typically not flat. For example, erbium-doped fiber gain stages may have a characteristic shape, as shown in FIG. 16. The dynamic filter 38 (or a dynamic filter 38 and a static spectral filter that are being used together) may produce a loss (or gain) spectrum that tends to flatten and modify the spectral shape of the gain spectrum of amplifier 18.

Figure 17:
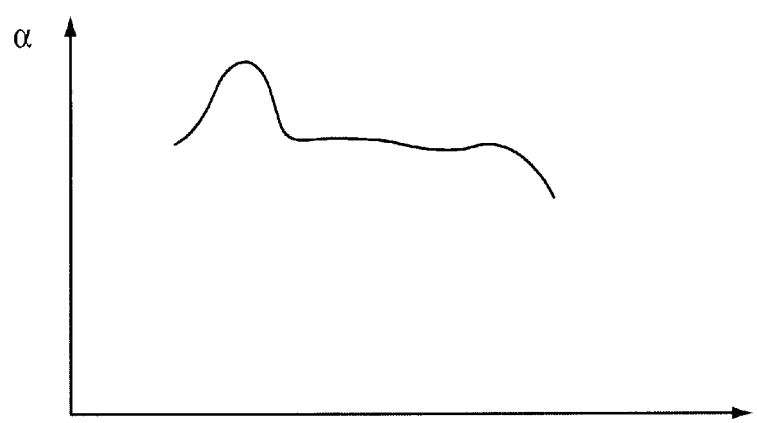
FIG. 17 is a graph of an illustrative loss spectrum that may be produced by a dynamic spectral filter in an optical amplifier having a gain stage of the type shown in FIG. 16 in accordance with the present invention.
Figure 18:
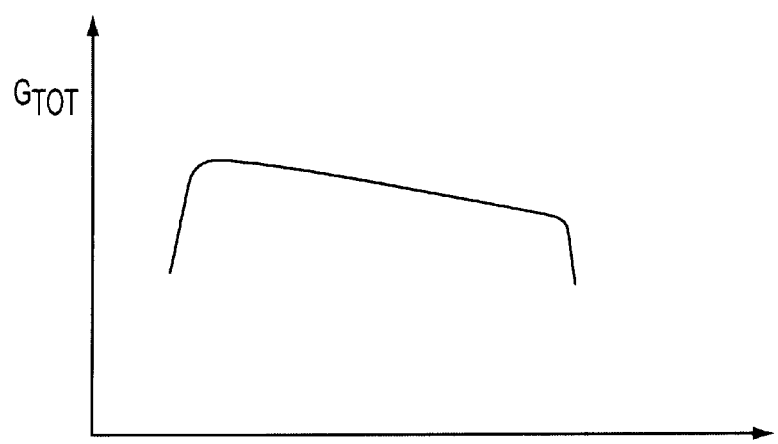
FIG. 18 is a graph of an illustrative overall gain spectrum for an amplifier having a gain stage spectrum of the type shown in FIG. 16 and a spectral filter loss spectrum of the type shown in FIG. 17 in accordance with the present invention.

An illustrative spectrum $\alpha$ that a dynamic filter 38 may use is shown in FIG. 17. The illustrative dynamic filter spectrum of FIG. 17 may modify the spectrum of the gain stages of FIG. 16 so that the overall gain spectrum $G_{TOT}$ for the amplifier 18 is as shown in FIG. 18. In the example of FIGS. 16–18, the desired gain spectrum is slightly tilted, so that the gain at longer wavelengths is less than the gain at shorter wavelengths. This is merely illustrative. Control unit 40 may adjust dynamic filter 38 to produce any desired spectral shape for the gain.

The gain spectrum that is needed for an amplifier 18 or other equipment may change over time. If, for example, the number of channels on link 10 changes, effects such as signal-induced Raman pumping of longer-wavelength channels by shorter wavelength channels may change and this may require that the spectrum $\alpha$ be adjusted.

As the spectrum of dynamic filter 38 is adjusted, the value of $\alpha$ that is requested by control unit 40 may sometimes exceed or nearly exceed the values of $\alpha$ that are available. This may occur, for example, when the nature of the desired spectrum forces control unit 40 to request that dynamic filter 38 produce a spectrum $\alpha$ that exceeds the dynamic range of loss values available from filter 38.

Figure 19:
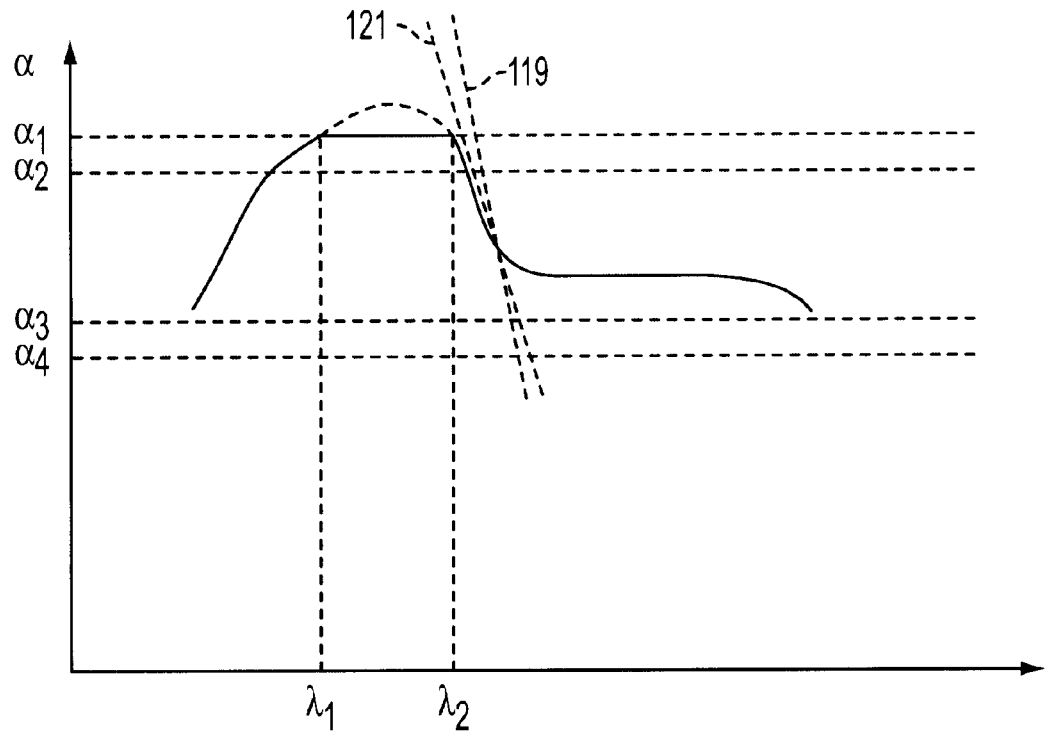
FIG. 19 is a graph that shows an illustrative dynamic filter spectrum that may be produced by a dynamic filter in relation to illustrative alarm threshold values that have been established in accordance with the present invention.

An illustrative spectrum $\alpha$ a for a dynamic filter having a dynamic range that has been exceeded is shown in FIG. 19.

Two threshold ranges have been established in the example of FIG. 19. Loss values above $\alpha_1$ or below $\alpha_4$ cannot be produced, because such values exceed the capabilities of dynamic filter 38 and are out of range. Dynamic filter 38 is capable of producing loss values between $\alpha_1$ and $\alpha_4$, but loss values between $\alpha_1$ and $\alpha_2$ and between $\alpha_3$ and $\alpha_4$ are nearly out of range. When the loss of dynamic filter 38 reaches either $\alpha_1$ or $\alpha_4$, control unit 40 may generate a dynamic filter out of range alarm. When the loss of dynamic filter 38 falls in the warning bands between $\alpha_1$ and $\alpha_2$ and between $\alpha_3$ and $\alpha_4$ a dynamic filter out or range warning alarm may be generated.

If desired, information on the wavelength range or ranges in which the dynamic filter is out of range or nearly out of range may be provided with the alarms. For example, information that the dynamic filter is out of range in the wavelength range from $\lambda_1$ to $\lambda_2$ in the example of FIG. 19 may be provided using lines 80 or other suitable paths when it is determined that dynamic filter 38 is out of range or almost out of range for these wavelengths and when a filter out-of-range or a filter out-of-range warning alarm has been generated.

Dynamic filter 38 may not be capable of producing perfect step function changes in its loss spectrum as a function of wavelength. Large changes in the loss spectrum of dynamic filter 38 may need to be made somewhat gradually over a range of wavelengths or channels. When dynamic filter 38 is directed to produce a spectral change that is too rapid (e.g., because it exceeds the slope of a line such as dotted line 119 of FIG. 19) or that is nearly too rapid (e.g., because it exceeds the slope of a line such as dotted line 121 of FIG. 19), a dynamic filter slope out-of-range alarm or dynamic filter slope out-of-range warning alarm may be generated. If desired, information on which wavelength range or ranges have a dynamic filter loss slope that is out of range or almost out of range may be provided when an alarm is generated.

The temperature of some of the components used in amplifiers 18 and other modules 23 may be controlled using Peltier effect thermoelectric cooling elements or other suitable temperature controllers. For example, the temperature of components such as optical channel monitor 47, laser diode 52, and dynamic filter 38 may be controlled. Erbium-doped fiber 32 may be housed in a chamber that is temperature-controlled using a Peltier effect thermoelectric cooling element or other suitable temperature controller. Such temperature-controlled components may be maintained at a suitable temperature such as room temperature, 10–20° C. above room temperature, or any other temperature or temperatures. Temperature readings may be made using temperature sensors so that control unit 40 may control the temperatures of the components using feedback control schemes.

Figure 20:
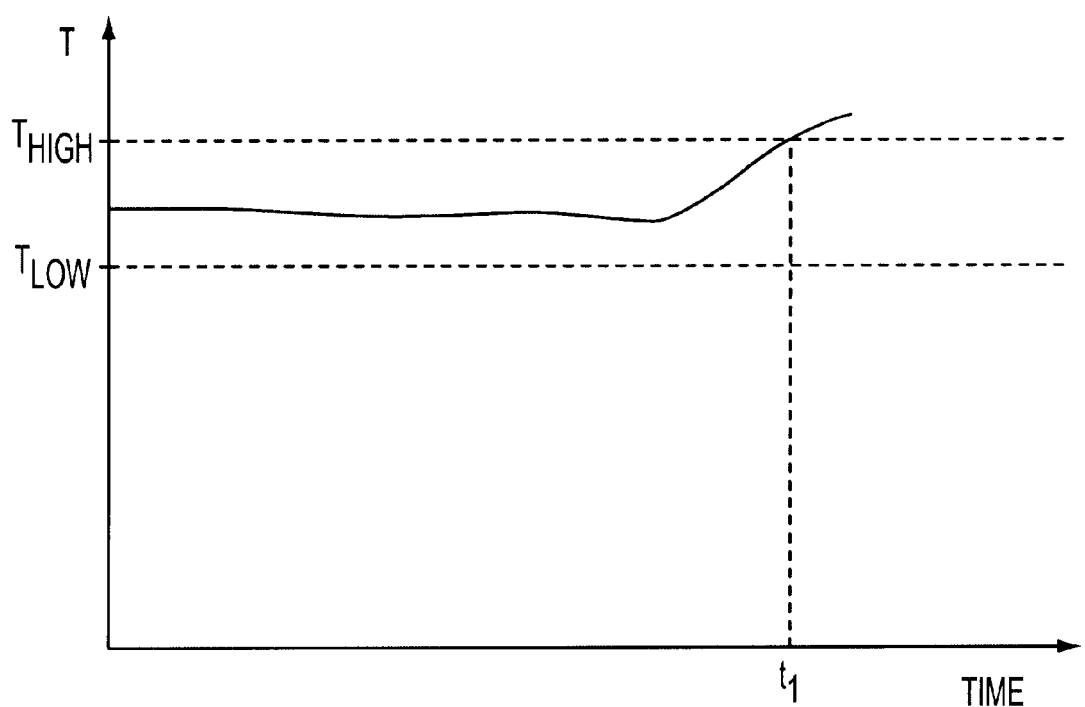
FIG. 20 is a graph showing how the temperature of a dynamic filter may vary in time relative to a temperature range that has been established in accordance with the present invention.

Control unit 40 may also monitor the temperatures of the components to determine whether measured temperatures have become too high or too low. An illustrative temperature measurement that control unit 40 has made for a given one of the components is shown in FIG. 20. A normal temperature range has been established using upper and lower temperature limits $T_{HIGH}$ and $T_{LOW}$. As shown in FIG. 20, at time $t_1$, the temperature of the given component has exceeded the maximum desired temperature, so control unit 40 may generate a temperature out of range command. If, for example, the component being monitored is a dynamic filter, control unit 40 may generate a dynamic filter temperature out of range command. If the component being monitored is a length of erbium-doped fiber or other rare-earth-doped fiber, control unit 40 may generate a fiber temperature out of range command. If desired, temperature out of range warning commands (and other suitable warning commands) may be generated when these temperature limits are nearly exceeded.

A table showing illustrative pin assignments that may be used for output pins 86 when pins are used for alarms is shown in FIG. 21. One or more of pins 86 may be activated (i.e., taken high or low as appropriate) to indicate the presence of an alarm condition. The same types of alarm signals may be provided over a data port 80 or other suitable paths 27 if desired.

In the example of FIG. 21, pin 1 may be activated when a loss of input condition is detected. A loss of input may be detected when, for example, the total power measured by control unit 40 using input tap 42 and monitor 46 is zero or is below a given threshold. A loss of output alarm may be generated by taking pin 2 high when the output power measured using tap 44 and monitor 48 indicates that the entire output signal spectrum has been lost.

As described in connection with FIG. 9, control unit 40 may use optical channel monitor 47 to determine when a band of signal channels has been lost. Pins such as pins 3–6 may be used for alarms in such situations. Alarms may also be established for situations in which a given set of non-adjacent channels is lost.

Pin 7 may be activated when an active channel goes out of range, as described in connection with the alarm example of FIG. 8.

Pin 8 may be activated to indicate an alarm condition when a given number of channels has become inactive, as described in connection with FIG. 10.

A power or gain ripple out-of-range alarm may be generated under certain conditions, as described in connection with FIGS. 12–15. A ripple out of range alarm or ripple out of range warning alarm may be provided using pin 9.

Pin 10 may be used to support a gain out of range alarm when control unit 40 determines that the gain of amplifier 18 is too high or too low. A gain out of range warning alarm may also be provided.

Pins 11 and 12 may be used for alarms when the spectrum of dynamic filter 38 is nearly out of range or is out of range (i.e., when filter 38 has reached a maximum or minimum loss value), as described in connection with FIG. 19.

Pin 13 may be used for a temperature out of range alarm, as described in connection with FIG. 20. Temperature warning alarms may also be generated.

Pin 14 may be used when a user-defined alarm condition is detected, such as a user-defined alarm condition triggered by measurements made using optical channel monitor 47 or related to the status of dynamic filter 38.

Pins 15 and 16 may be used to accept control signals provided to control unit 40 from control and interface circuitry 25.

The alarms in the table of FIG. 21 are merely illustrative. Any suitable alarms may be supported if desired.

Figure 22:
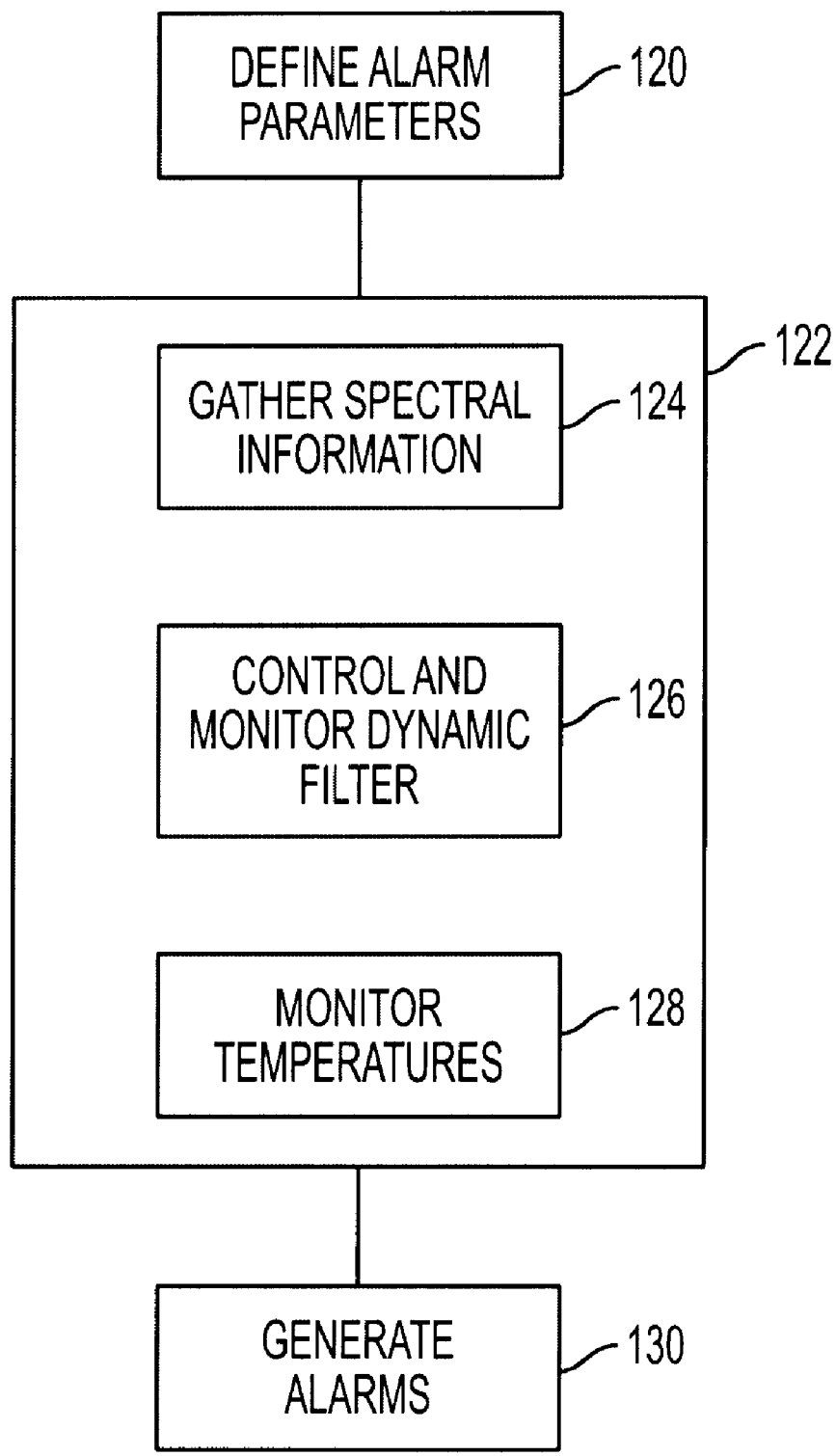
FIG. 22 is a flow chart of illustrative steps involved in using alarms in optical network equipment in accordance with the present invention.

Illustrative steps involved in supporting alarm functions using an amplifier 18 or other module 23 or equipment are shown in FIG. 22. At step 120, alarm parameters may be defined. Parameters for alarms may be provided in the form of thresholds or any other suitable numbers or parameters. As an example, alarm parameters may be defined by establishing alarm thresholds values such as the values of $P_{HIGH}$, $P_{LOW}$, and $P_{OFF}$ of FIG. 8, $N_{TH}$ of FIG. 11, $P_1$ and $P_2$ of FIG. 12, $G_1$ and $G_2$ of FIG. 15, $\alpha_1$, $\alpha_2$, $\alpha_3$, and $\alpha_4$ of FIG. 19, and $T_{HIGH}$ and $T_{LOW}$ of FIG. 20. Information on alarm parameters may be stored in memory 92 or other suitable storage in a module 23. Alarm parameter information may be stored during the manufacturing process, after a module 23 is at a customer site, after a module 23 has been installed in a network, or at any other suitable stage. Alarm parameters may be selected by the manufacturer or any other suitable personnel. User-defined alarm parameters may be stored in a module 23 using menu-driven software or any other suitable programming arrangement.

After the alarm parameters have been defined at step 120, the module 23 may be operated at step 122. For example, amplifiers 18 or other equipment including modules such as modules 23 may be used in fiber-optic links such as link 10 of FIG. 1. During operation, module control units 40 may use optical channel monitors 47 to gather spectral information at step 124. Control units 40 may also control and monitor dynamic spectral filters 38 at step 126. Temperature information may be collected by control units 40 at step 128. For example, control unit 40 may collect information from temperature sensors or may deduce temperature status information from the known drive conditions used for temperature controllers in modules 23. The temperatures of components such as optical channel monitors 47, dynamic filters 38, fiber coils 32, pumps 34, or other suitable components may be monitored.

At step 130, control units 40 may generate alarms. Alarms may be generated when information on component settings and measured component data such as optical input or output channel powers, optical channel gains, total input or output powers, dynamic filter settings, temperatures or any other suitable information indicates that the alarm thresholds established at step 120 have been exceeded or that other alarm parameter conditions established at step 120 have been satisfied.

It will be understood that the foregoing is merely illustrative of the principles of this invention, and that various modifications can be made by those skilled in the art without departing from the scope and spirit of the invention.

What is claimed is:

1. Optical network equipment for use in a fiber-optic communications link that carries optical signals, comprising:
    at least one optical gain stage that amplifies the optical signals;
    a dynamic spectral filter that spectrally modifies the optical signals;
    an optical channel monitor for making spectral measurements on the optical signals; and
    a control unit that uses the spectral measurements of the optical channel monitor to generate alarms, wherein the dynamic spectral filter has a limited spectral operating range and wherein the control unit is configured to generate a dynamic filter out of range alarm when the dynamic filter has at least partially reached the limits of its operating range.

2. The optical network equipment defined in claim 1 further comprising memory in which alarm threshold values are stored.

3. The optical network equipment defined in claim 1 further comprising a temperature sensor that measures the temperature of the dynamic spectral filter, wherein the control unit is configured to generate an alarm when the measured temperature of the dynamic spectral filter is out of range.

4. The optical network equipment defined in claim 1 wherein the optical signals lie in at least two signal bands and wherein the control unit is configured to use the spectral measurements from the optical channel monitor to generate an alarm when signals are lost in one of the two signal bands regardless of whether signals are lost in the other of the two signal bands.

5. The optical network equipment defined in claim 1 wherein the optical signals are associated with multiple wavelength-division-multiplexing channels at different wavelengths and wherein the control unit is configured to use the spectral measurements from the optical channel monitor to generate an alarm when a given one of the channels is determined to be active and out of range.

6. The optical network equipment defined in claim 1 wherein the optical signals are associated with multiple wavelength-division-multiplexing channels at different wavelengths and wherein the control unit is configured to use the spectral measurements from the optical channel monitor to generate an alarm when a given number of the channels are determined to be inactive.

7. The optical network equipment defined in claim 1 wherein the equipment has an associated optical gain ripple and wherein the control unit is configured to use the spectral measurements from the optical channel monitor to generate an alarm when the gain ripple exceeds a threshold amount.

8. The optical network equipment defined in claim 1 wherein the control unit is configured to generate at least one user-defined alarm related to the status of the dynamic spectral filter.

9. The optical network equipment defined in claim 1 wherein the optical signals are associated with multiple wavelength-division-multiplexing channels at different wavelengths and wherein the control unit is configured to use the spectral measurements from the optical channel monitor to generate a noise alarm based on detected power fluctuations of at least one of the channels.

10. The optical network equipment defined in claim 1 wherein the gain stage, dynamic spectral filter, optical channel monitor, and control unit are part of an amplifier module, the equipment further comprising:
control and interface circuitry; and
I/O pins and lines associated with the module that connect the control unit to the control and interface circuitry, wherein the control unit is configured to provide the alarms to the control and interface circuitry by activating at least one of the I/O pins.

11. An optical amplifier that amplifies optical signals in a fiber-optic communications network, comprising:
first and second gain stages that provide optical gain for the optical signals;
a dynamic spectral filter that spectrally modifies the optical signals;
a temperature controller connected to the dynamic spectral filter that controls the temperature of the dynamic spectral filter;
at least one output; and
a control unit configured to monitor the temperature of the dynamic spectral filter and configured to produce a dynamic filter temperature out of range alarm using the output when the monitored temperature of the dynamic filter is out of range.

12. The optical amplifier defined in claim 11 further comprising non-volatile memory in which at least one dynamic filter temperature threshold value is stored for use by the control unit in generating the dynamic filter temperature out of range alarm.

13. The optical amplifier defined in claim 11 wherein the optical signals are associated with a plurality of wavelength-division-multiplexing channels at different wavelengths, the optical amplifier further comprising an optical channel monitor that measures optical channel power spectra for the optical signals on different channels.

14. The optical amplifier defined in claim 11 wherein the optical signals are associated with a plurality of wavelength-division-multiplexing channels at different wavelengths, the optical amplifier further comprising an optical channel monitor that measures optical channel power spectra for the optical signals on different channels, wherein the control unit is configured to use spectral channel power measurements from the optical channel monitor to generate alarms.

15. The optical amplifier defined in claim 11 wherein the first and second gain stages include optically-pumped rare-earth-doped fiber.

16. Optical network equipment for use in a fiber-optic communications link that carries optical signals, comprising:
at least one optical gain stage that amplifies the optical signals;
a dynamic spectral filter that spectrally modifies the optical signals;
an optical channel monitor for making spectral measurements on the optical signals; and
a control unit that uses the spectral measurements of the optical channel monitor to generate alarms, wherein the dynamic filter has a limited spectral operating range, wherein the control unit is configured to generate a dynamic filter out of range alarm when the dynamic filter has at least partially reached the limits of its operating range, and wherein the control unit is configured to provide information with the dynamic filter out of range alarm that indicates wavelengths at which the operating range of the dynamic filter has been exceeded.

17. Optical network equipment for use in a fiber-optic communications link that carries optical signals, comprising:
at least one optical gain stage that amplifies the optical signals;
a dynamic spectral filter that spectrally modifies the optical signals;
an optical channel monitor for making spectral measurements on the optical signals; and
a control unit that uses the spectral measurements of the optical channel monitor to generate alarms, wherein the dynamic filter has a limited spectral operating range and wherein the control unit is configured to generate a dynamic filter out of range alarm when the dynamic filter produces a spectrum that falls at least partly within a warning band at the limit of the dynamic filter operating range.

18. Optical network equipment for use in a fiber-optic communications link that carries optical signals, comprising:
at least one optical gain stage that amplifies the optical signals;
a dynamic spectral filter that spectrally modifies the optical signals;
an optical channel monitor for making spectral measurements on the optical signals; and
a control unit that uses the spectral measurements of the optical channel monitor to generate alarms, wherein the dynamic filter produces a loss spectrum having a maximum loss value and a minimum loss value and wherein the control unit is configured to generate a dynamic filter out of range alarm when the dynamic filter has produced a loss value for at least one wavelength that matches the maximum or minimum loss value.

19. Optical network equipment for use in a fiber-optic communications link that carries optical signals, comprising:
- at least one optical gain stage that amplifies the optical signals;
- a dynamic spectral filter that spectrally modifies the optical signals;
- an optical channel monitor for making spectral measurements on the optical signals; and
- a control unit that uses the spectral measurements of the optical channel monitor to generate alarms, wherein the dynamic filter has a maximum loss spectrum slope and wherein the control unit is configured to generate an alarm when the dynamic filter produces a loss spectrum having a slope that exceeds a predefined slope value.

* * * * *